United States Patent
Lv et al.

(10) Patent No.: US 11,068,371 B2
(45) Date of Patent: Jul. 20, 2021

(54) METHOD AND APPARATUS FOR SIMULATING SLOW STORAGE DISK

(71) Applicant: EMC IP HOLDING COMPANY LLC, Hopkinton, MA (US)

(72) Inventors: Man Lv, Beijing (CN); Bing Liu, Tianjin (CN); Colin Yong Zou, Beijing (CN); Martin Chaojun Mei, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 921 days.

(21) Appl. No.: 15/358,192

(22) Filed: Nov. 22, 2016

(65) Prior Publication Data

US 2017/0154142 A1 Jun. 1, 2017

(30) Foreign Application Priority Data

Nov. 26, 2015 (CN) .......................... 201510847327.7

(51) Int. Cl.
  *G06F 11/26* (2006.01)
  *G06F 3/06* (2006.01)
  *G06F 11/30* (2006.01)
  *G06F 11/34* (2006.01)

(52) U.S. Cl.
  CPC ............ *G06F 11/261* (2013.01); *G06F 3/061* (2013.01); *G06F 3/0659* (2013.01); *G06F 3/0664* (2013.01); *G06F 3/0689* (2013.01); *G06F 11/3034* (2013.01); *G06F 11/3457* (2013.01)

(58) Field of Classification Search
  CPC .... G06F 17/5022; G06F 11/261; G06F 3/061; G06F 3/0659; G06F 3/0664; G06F 3/0689; G06F 11/3034; G06F 11/3457

USPC .......................................................... 703/21
See application file for complete search history.

(56) References Cited

U.S. PATENT DOCUMENTS

| | | | |
|---|---|---|---|
| 5,088,058 A | 2/1992 | Salsburg | |
| 8,027,827 B2 * | 9/2011 | Bitar | G06F 11/3457 703/21 |
| 8,200,888 B2 * | 6/2012 | Simonson | G06F 3/0664 711/103 |
| 8,874,966 B1 * | 10/2014 | Garrett, Jr. | G06F 11/3672 714/35 |

(Continued)

FOREIGN PATENT DOCUMENTS

| | | |
|---|---|---|
| CN | 102354298 A  * | 2/2012 |
| CN | 103488544 | 1/2014 |

(Continued)

OTHER PUBLICATIONS

Wang, Qi, etal. "InterSense: Interconnect Performance Emulator for Future Scale-out Distributed Memory Applications." 2015 IEEE 23rd International Symposium on Modeling, Analysis, and Simulation of Computer and Telecommunication Systems. IEEE, 2015. pp. 122-125. (Year: 2015).*

*Primary Examiner* — Kamini S Shah
*Assistant Examiner* — John E Johansen
(74) *Attorney, Agent, or Firm* — BainwoodHuang

(57) ABSTRACT

Technology for simulating a slow storage disk. The technology intercepts an input/output I/O command to be dispatched to a storage disk and simulates a slow storage disk with the storage disk by injecting a delay to the dispatch of the intercepted I/O command based on a predetermined delay injection policy.

17 Claims, 5 Drawing Sheets

(56) References Cited

U.S. PATENT DOCUMENTS

2013/0117286 A1\* 5/2013 Gallant ................ G06F 3/0665
707/752
2014/0304428 A1\* 10/2014 Fischer-Toubol ..... G06F 3/0635
710/5

FOREIGN PATENT DOCUMENTS

| CN | 103488544 A | \* | 1/2014 |
| CN | 103917957 | | 7/2014 |

\* cited by examiner

METHOD AND APPARATUS FOR SIMULATING SLOW STORAGE DISK

RELATED APPLICATION

This application claim priority from Chinese Patent Application Number CN201510847327.7, filed on Nov. 26, 2015 at the State Intellectual Property Office, China, titled "METHOD AND APPARATUS FOR SIMULATING SLOW STORAGE DISK," the contents of which is herein incorporated by reference in its entirety.

FIELD OF THE DISCLOSURE

Embodiments of the present disclosure generally relate to the field of storage, and more particularly, to a method and apparatus for simulating a slow storage disk.

BACKGROUND

Typically, hardware of a storage system includes one or more storage disks. Performance of a storage disk may greatly impact the storage system's performance when the storage disk is used as a root file system disk. One of factors associated with the performance of the storage disk is input/output (I/O) response time. The I/O response time refers to the time between sending of an I/O request by a user to and receiving of the storage disk's response to the I/O request. Due to mechanical problems (such as head degradation) or environmental problems (such as excessive humidity), the I/O response time of the storage disk may become longer, thereby becoming a "slow storage disk" (hereinafter referred to as "slow disk" for short). The slow disk will exert an adverse impact on the storage system's performance. Therefore, a challenge confronted with storage system providers is how to simulate events of slow disks for fully testing the impact of the slow disks on the storage system so as to remove future possible adverse impact before release of the storage system.

Currently, slow disks are usually tested in hardware-based ways. For example, testing is implemented by using a real slow disk returned from the client field or from the storage disk vendor. For another example, testing is implemented by using a special storage disk simulator.

However, the above two solutions have their respective disadvantages. For example, regarding the first solution, a real slow disk is especially hard to get. Moreover, even if such a slow disk can be obtained, its pattern of slowness is fixed, the impact of the slow disk on the storage system is hard to fully test. Regarding the second solution, since a special storage disk simulator has to be bought, testing cost is increased. Furthermore, such a special storage disk simulator, after being incorporated into the storage system, cannot operate like a conventional storage disk.

Therefore, there is a need for providing a technical solution that is easy to simulate a slow disk.

SUMMARY

To solve one or more problems in the prior art, embodiments of the present disclosure propose a technical solution for simulating a slow disk by using software.

In a first aspect of the present disclosure, there is provided a method of simulating a slow storage disk. The method comprises intercepting an input/output I/O command to be dispatched to a storage disk; and simulating the slow storage disk with the storage disk by injecting a delay to dispatch of the intercepted I/O command based on a predetermined delay injection policy.

In some embodiments, the delay injection policy indicates at least one of the following: storage disks for which the delay injection policy is to be used and a type of I/O commands for which the delay injection policy is to be used.

In some embodiments, if the delay injection policy indicates the storage disks for which the delay injection policy is to be used, injecting the delay to the dispatch of the intercepted I/O command comprises: identifying the storage disk to which the intercepted I/O command is to be dispatched; determining whether the storage disk to which the intercepted I/O command is to be dispatched matches one of the storage disks indicated by the delay injection policy; and in response to the storage disk to which the intercepted I/O command is to be dispatched matching one of the storage disks indicated by the delay injection policy, injecting the delay to the dispatch of the intercepted I/O command.

In some embodiments, if the delay injection policy indicates the type of I/O commands for which the delay injection policy is to be used, injecting the delay to the dispatch of the intercepted I/O command comprises: identifying a type of the intercepted I/O command; determining whether the identified type matches the type of I/O commands indicated by the delay injection policy; and in response to the identified type matching the type of I/O commands indicated by the delay injection policy, injecting the delay to the dispatch of the intercepted I/O command.

In some embodiments, the delay injection policy further indicates: injecting delays to dispatches of a predetermined number of I/O commands; and a frequency at which the delays are to be injected to the dispatches of the predetermined number of I/O commands.

In some embodiments, injecting the delay to the dispatch of the intercepted I/O command comprises: determining whether to inject the delay to the dispatch of the intercepted I/O command by using a random algorithm.

In a second aspect of the present disclosure, there is provided an apparatus for simulating a slow storage disk. The apparatus comprises: an intercepting unit configured to intercept an input/output I/O command to be dispatched to a storage disk; and a delay injecting unit configured to simulate the slow storage disk with the storage disk by injecting a delay to dispatch of the intercepted I/O command based on a predetermined delay injection policy.

In a third aspect of the present disclosure, there is provided a server. The server comprises an apparatus for simulating a slow storage disk according to the second aspect of the present disclosure.

In a fourth aspect of the present disclosure, there is provided a server. The server comprises at least one processing unit; a memory coupled to the at least one processing unit and storing instructions thereon, the instructions, when executed by the at least one processing unit, performing actions in the method according to the first aspect of the present disclosure.

In a fifth aspect of the present disclosure, there is provided a computer program product. The computer program product is tangibly stored on a non-transient machine-readable medium and comprises machine-executable instructions, the instructions, when executed on a device, causing the device to execute the method according to the first aspect of the present disclosure.

According to various embodiments of the present disclosure, since slow disks are simulated with software, no extra hardware is required. Thus, the cost of testing slow disks is reduced. In addition, by means of interfaces provided by the kernel of an operating system, users may flexibly and dynamically configure delay injection policies. Furthermore, any pattern of slowness of slow disks may be simulated according to delay injection policies configured by users.

Existing solutions are implemented depending on the amount of available real slow disks or storage disk simulators, and thus cannot be implemented simultaneously on many storage disks. However, according to various embodiments of the present disclosure, slow disk simulation can be implemented simultaneously on a large amount of storage disks, so that scalability is achieved. Moreover, with various embodiments of the present disclosure, there is no need to change other components of the operating system, so that transparency is achieved.

BRIEF DESCRIPTION OF THE DRAWINGS

Through the detailed description of some embodiments of the present disclosure in the accompanying drawings, the features, advantages and other aspects of the present disclosure will become more apparent, wherein several embodiments of the present disclosure are shown for the illustration purpose only, rather than for limitation. In the accompanying drawings.

DETAILED DESCRIPTION

Principles of the present disclosure are described below by means of several exemplary embodiments as shown in the accompanying drawings. It should be understood that these embodiments are described only for enabling those skilled in the art to better understand and further implement the present disclosure, rather for limiting the scope of the present disclosure in any manner.

Figure 1:
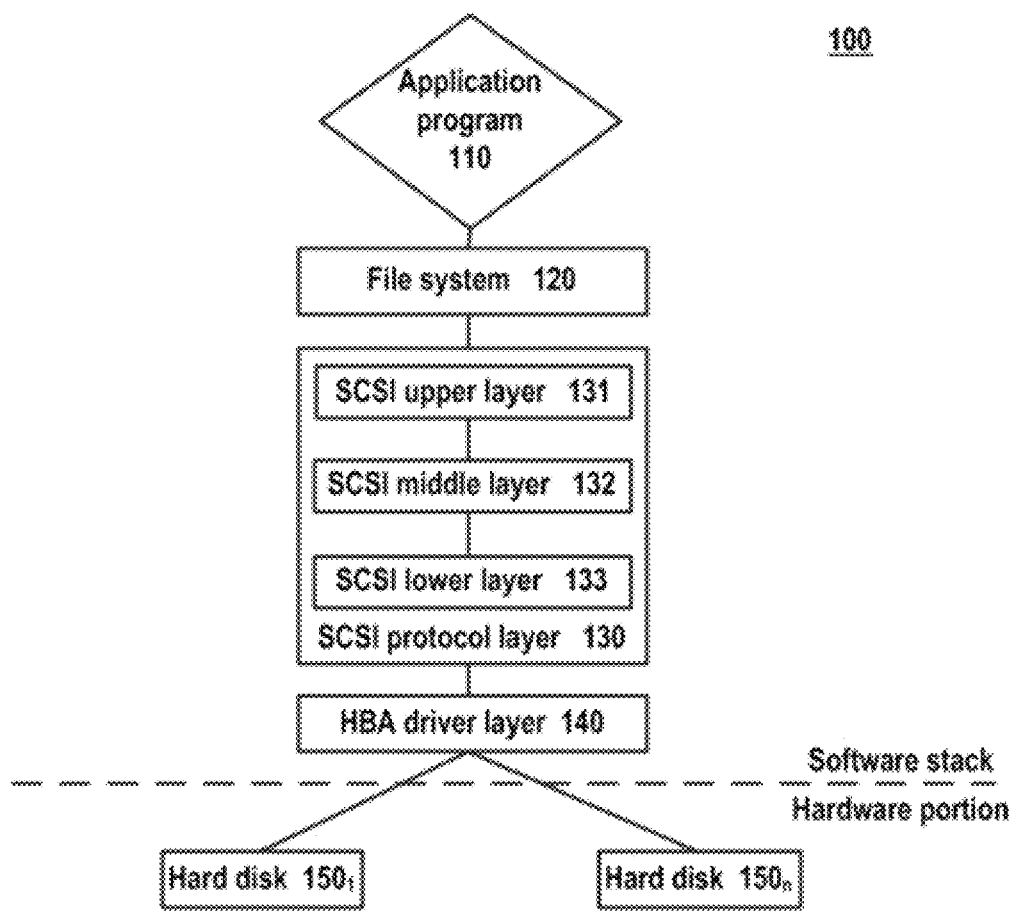
FIG. 1 a block diagram of an architecture of a storage system in which embodiments of the present disclosure may be implemented.

FIG. 1 a block diagram of an architecture 100 of a storage system in which embodiments of the present disclosure may be implemented. For example, the architecture 100 may employ a Linux operating system. Description of the Linux operating system here is only intended to present an exemplary storage system implementation architecture, instead of limiting the scope of the present disclosure by means of any detail in this example. Those skilled in the art may understand any other suitable operating systems may be used to support various embodiments of the present disclosure.

As shown in FIG. 1, the architecture 100 includes a software stack and a hardware portion. The software stack includes an application program 110, a file system 120, a Small Computer System Interface (SCSI) protocol layer 130 and a Host Bus Adapter (HBA) driver layer 140. The hardware portion includes storage disks $150_1, \ldots, 150_n$ (collectively referred to a storage disk 150).

Specifically, SCSI protocol layer 130 includes a SCSI upper layer 131, a SCSI middle layer 132 and a SCSI lower layer 133.

SCSI upper layer 131 is a SCSI device driver layer, which may be provided by SCSI device developers. SCSI upper layer 131 is configured to receive a request from an upper layer (such as a file system) and translate it into a SCSI request, and in the meanwhile, return status information and a SCSI command executed by SCSI middle layer 132 to the upper layer.

SCSI middle layer 132 is a SCSI bus driver layer, which may be provided by operating system developers. SCSI middle layer 132 is a common service layer for SCSI upper layer 131 and SCSI lower layer 133, and provides a plurality of functions that may be used by upper layer and lower layer drivers. SCSI middle layer 132 is the core of SCSI protocol layer 130 and may include a plurality of functions associated with SCSI protocol modularity, such as bus scanning, error handling, SCSI commands queuing and so on. This means that different interface types of HBAs may be used in the same way. In addition, SCSI middle layer 132 may translate a SCSI request from SCSI upper layer 131 into a SCSI command. After execution of the SCSI command is completed, SCSI middle layer 132 may receive a SCSI response from SCSI lower layer 133 and notify SCSI upper layer 131 of completion of the responded SCSI request.

SCSI lower layer 133 is an adapter driving layer, which may be provided by adapter vendors. SCSI lower layer 133 may include a large amount of codes which are applicable to process different adapter types.

A HBA is a circuit board and/or an integrated circuit adapter that provides I/O processing and physical connection between a server and storage devices (such as storage disk 150). HBA driver layer 140 is configured to enable communication between the server and the storage device.

In the architecture 100 as shown in FIG. 1, an I/O request from a user is forwarded to SCSI middle layer 132 via application program 110, file system 120 and SCSI upper layer 131. SCSI middle layer 132 translates this I/O request into an I/O command and dispatches it to HBA driver layer 140 via SCSI lower layer 133. HBA driver layer 140 encapsulates the I/O command into a package and forwards the package to a controller (not shown in FIG. 1) of storage disk 150 via a storage network (not shown in FIG. 1). The controller of storage disk 150 parses the received package and translates it into an I/O command recognizable to storage disk 150.

Figure 2:
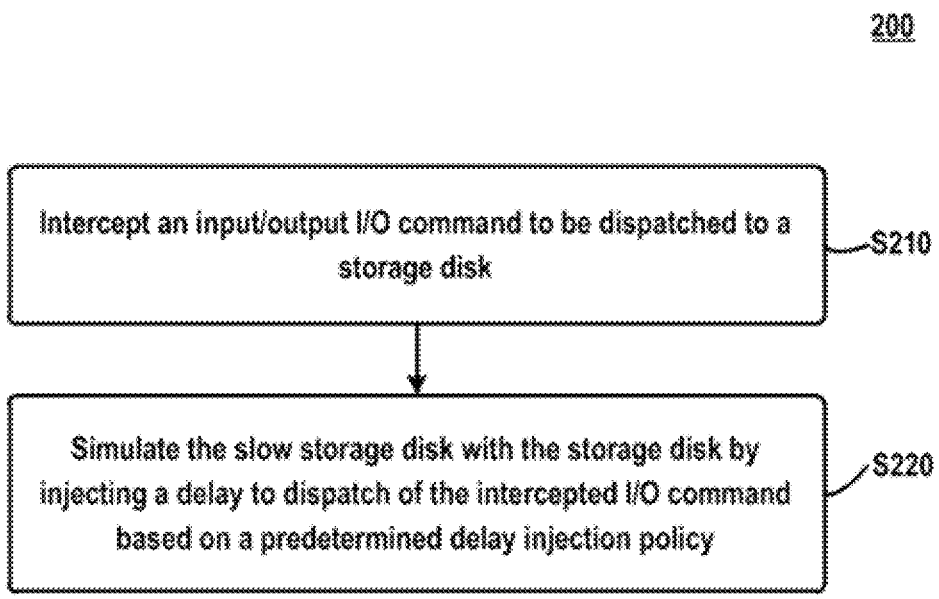
FIG. 2 shows a flowchart of a method for simulating a slow disk according to an embodiment of the present disclosure.

FIG. 2 shows a flowchart of a method 200 of simulating a slow storage disk according to an embodiment of the present disclosure. With reference to FIG. 2 and by means of the example of storage system implementation architecture 100 as shown in FIG. 1, detailed description is presented below to a method for simulating a slow storage disk according to an embodiment of the present disclosure.

As used herein, the term "storage disk" may include a solid-state drive (SSD), a hard disk drive (HDD), a solid-state hybrid drive (SSHD) or other similar storage device. The scope of the present disclosure is not limited in this regard. In addition, the storage disk may be a portion of a computer, a server or a storage system of other computing device.

In the context of the present disclosure, if during a period for statistics, among I/O requests with respect to one storage disk, there are more than a predetermined threshold amount of I/O requests and the response time for each of the predetermined threshold amount of I/O requests exceeds a predetermined time threshold, then the storage disk may be considered as a "slow storage disk" or "slow disk". The predetermined time threshold may be determined, for example, according to the type of the storage disk. For example, for a storage disk of a storage system or a personal computer, the predetermined time threshold may be determined as 10 ms; while for a SSD, the predetermined time threshold may be determined as 1 ms.

As shown in FIG. 2, in S210, an I/O command to be dispatched to a storage disk is intercepted. Since the present disclosure is intended to simulate a slow disk by intercepting an I/O command to be dispatched to a storage disk and injecting a delay to the intercepted I/O command, it is desired to intercept the I/O command and inject the delay at a software layer which is close to the storage disk as possible. As described above, storage disk 150 is physically connected with a server via HBA (e.g., as shown by HBA driver layer 140). In other words, HBA driver layer 140 is the software layer that is closest to storage disk 150 in the software stack. Therefore, in some embodiments, the I/O command to be dispatched to storage disk 150 may be intercepted at HBA driver layer 140 communicating with storage disk 150, so that the impact of the software layer on delay injection may be minimized.

However, various types of HBAs (i.e., HBAs having different types of interfaces) may be used to physically connect storage disk 150 with the server. If the I/O command is intercepted at HBA driver layer 140 and the delay is injected thereto, it means a driver of each type of HBA needs to be altered, so that the general applicability of the method according to the present disclosure will be decreased. In addition, considering that SCSI middle layer 132 is a common layer which will be used by most block devices and is a software layer which is closer to storage disk 150, in another embodiments, the I/O command to be dispatched to storage disk 150 may be intercepted at SCSI middle layer 132 communicating with storage disk 150.

Still with reference to FIG. 2, in S220, the slow storage disk is simulated with the storage disk by injecting a delay to dispatch of the intercepted I/O command based on a predetermined delay injection policy.

As described above, the duration between sending of an I/O request by the user and receiving of the storage disk's response to the I/O request is called I/O response time. The I/O response time includes the time required to dispatch an I/O request from the user to the storage disk and the time required for the storage disk to return a response to the I/O request to the user. The embodiment of the present disclosure is intended to intercept an I/O command to be dispatched to the storage disk and inject a delay to the intercepted I/O command, which means extending the time for dispatching an I/O request from the user to the storage disk.

In embodiments of the present disclosure, the delay injection policy may be determined or configured in advance by the user according to needs. In some embodiments, the predetermined delay injection policy may only indicate the storage disk for which the delay injection policy is to be used, instead of indicating the type of the I/O command for which the delay injection policy is to be used. For example, the predetermined delay injection policy may indicate a specific storage disk in the storage system for which the delay injection policy is to be used. In other words, the predetermined delay injection policy may indicate injecting delays to dispatches of all I/O commands for the specific storage disk in the storage system, regardless of the type of the I/O commands. For another example, the predetermined delay injection policy may indicate all storage disks in the storage system for which the delay injection policy is to be used. In other words, the predetermined delay injection policy may indicate injecting delays to dispatches of all I/O commands of all storage disks in the storage system, regardless of the type of the I/O commands.

In other embodiments, the predetermined delay injection policy may only indicate the type of I/O commands for which the delay injection policy is to be used, instead of indicating a storage disk for which the delay injection policy is to be used. In other words, the predetermined delay injection policy may indicate injecting delays to dispatches of a specific type of I/O commands (such as read or write commands) for all disks.

In further embodiments, the predetermined delay injection policy may indicate both a storage disk and the type of I/O commands for which the delay injection policy is to be used. In other words, the predetermined delay injection policy may indicate injecting delays to dispatches of a specific type of I/O commands (such as read or write commands) for a specific disk in the storage system.

In addition, in some embodiments, the predetermined delay injection policy may further indicate injecting delays to dispatches of a predetermined number of I/O commands and a frequency at which the delays are to be injected to the dispatches of the predetermined number of I/O commands In other words, the predetermined delay injection policy may indicate injecting delays to dispatches of a specific type of a predetermined number of I/O commands for a specific storage disk, injecting delays to dispatches of all types of a predetermined number of I/O commands for a specific storage disk, injecting delays to dispatches of a specific type of a predetermined number of I/O commands for all storage disks, or injecting delays to dispatches of all types of a predetermined number of I/O commands for all storage disks.

In addition, the predetermined delay injection policy may further indicate the desired duration of the delay.

It may be understood that generally I/O operations are executed in kernel mode of the operating system. The kernel of the operating system typically provides a series of interfaces to facilitate interaction with users. Therefore, in some embodiments, a delay injection policy determined by the user may be imported to the kernel of the operating system via an interface provided by the operating system. As one example, where a Linux operating system is used, each block device has a sysfs (sys file system) interface, and the user may read or modify some attribute files for the sysfs interface. For example, the user may import the delay injection policy to the kernel of the operating system by writing a corresponding character string to a configuration file for the sysfs interface. In addition, the user may also read the configuration file to see the current delay injection status, e.g. whether delay injection is enabled, to what type of I/Os delay will be injected, the length of delay, etc.

However, it should be understood that besides the sysfs interface, the user may also use any other appropriate means to import the delay injection policy to the kernel of the operating system, including but not limited to IO control (IOCTL) interface, PROC interface, system call, remote procedure call (RPC), etc.

According to the embodiments of the present disclosure, slow disk simulation is realized with software (e.g., in the software stack as shown in FIG. 1). The simulation overhead may be ignored since very little memory/CPU resource is required during the simulation.

Moreover, by means of the interface provided by the kernel of the operating system, the user may dynamically configure the delay injection policy. In addition, according to the user-configured delay injection policy, any pattern of slowness of the slow disk may be simulated. The pattern of slowness includes, but not limited to, slow response of a specific storage disk to a specific type of I/O commands (e.g., read or write), slow response of a specific storage disk to all types of I/O commands, slow response of all storage disks in the storage system to a specific type of I/O commands, and slow response of all storage disks in the storage system to all types of I/O commands.

Figure 3:
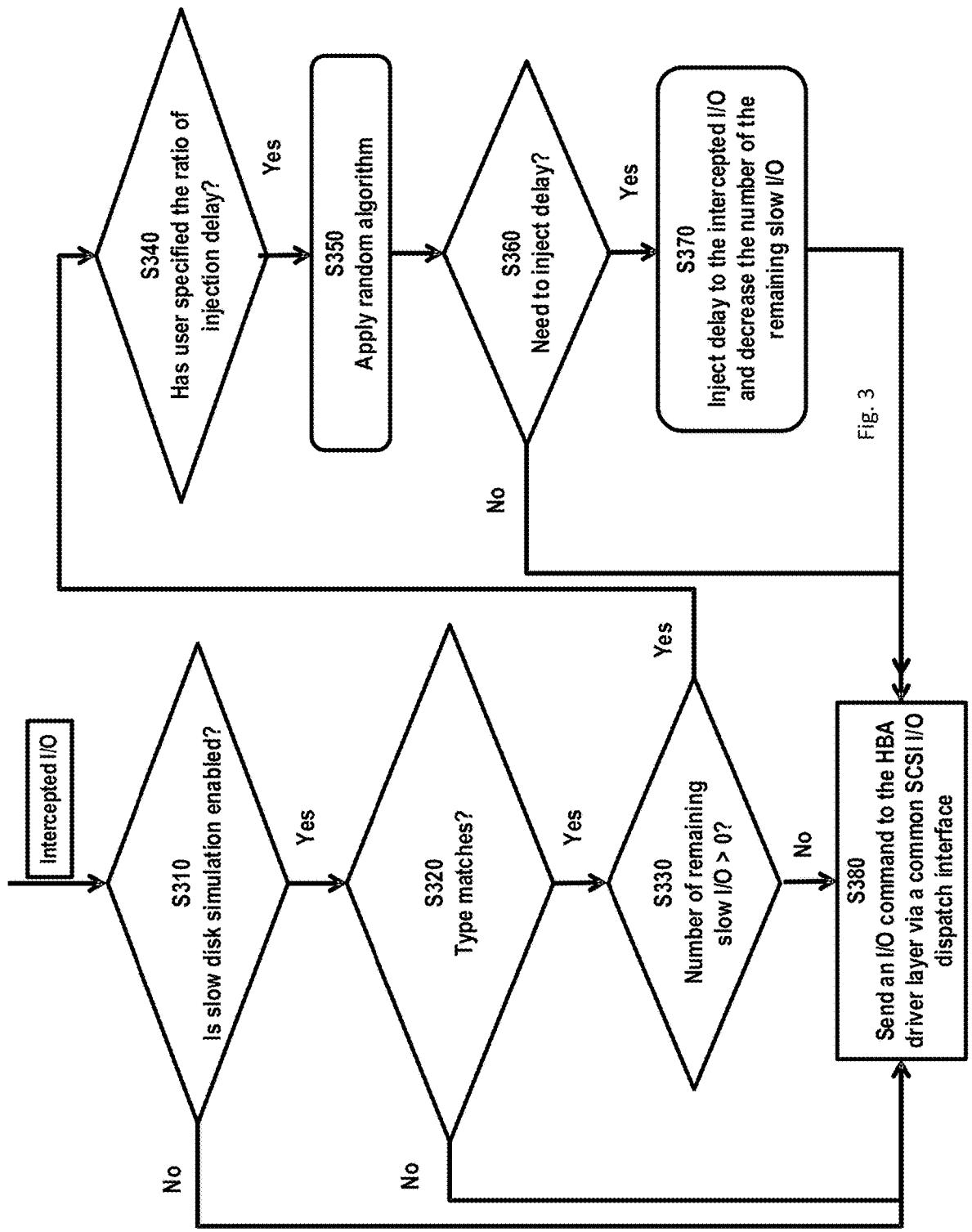
FIG. 3 shows a delay injection procedure according to an embodiment of the present disclosure.

With reference to FIG. 3, a delay injection procedure according to an embodiment of the present disclosure will be described. As described above, the predetermined delay injection policy may indicate injecting delays to dispatches of a specific type of I/O commands for a specific storage disk in the storage system. FIG. 3 shows an exemplary flowchart of a procedure 300 for injecting delays to dispatches of a specific type of I/O commands for a specific storage disk in the storage system. In one embodiment, procedure 300 may be executed at SCSI middle layer 132 as shown in FIG. 1.

As shown in FIG. 3, procedure 300 starts with the intercepted I/O command. It may be understood the I/O command per se may indicate a storage disk and the type of the I/O command to which an I/O operation is directed. For example, the I/O command may indicate an identifier of the storage disk to which the I/O operation is directed, and whether the type of the I/O command is read or write. In S310, it is determined whether a slow disk simulation procedure is initiated with respect to a storage disk indicated by the I/O command. In other words, in S310, a storage disk to which the intercepted I/O command is directed is identified, and it is determined whether the storage disk to which the intercepted I/O command is directed matches the storage disk indicated by the delay injection policy. If the storage disk to which the intercepted I/O command is directed matches the storage disk indicated by the delay injection policy, then procedure 300 proceeds to S320, or else to S380.

In S320, a type of the intercepted I/O command is identified, and it is determined whether the identified type matches the type of the I/O command as indicated by the delay injection policy. If the identified type matches the type of the I/O command as indicated by the delay injection policy, then procedure 300 proceeds to S330, or else to S380.

As described above, the predetermined delay injection policy may indicate injecting delays to dispatches of a specific type of a predetermined number of I/O commands for a specific storage disk. For example, the predetermined delay injection policy may indicate injecting delays to dispatches of 1000 read I/O commands for a specific storage disk. In this regard, in S330, it is determined whether the amount of the remaining I/O commands to which delay is to be injected (also called "remaining slow I/O" for short) is more than 0, i.e., it is determined whether delays are injected to dispatches of the predetermined number (e.g., 1000) of I/O commands. If yes, procedure 300 proceeds to S340, or else to S380.

As described above, the predetermined delay injection policy may indicate a frequency at which dispatches of the predetermined number of I/O commands are to be injected with delays. The frequency may specify a ratio of the amount of I/O commands, which dispatches are to be injected with delays within a predetermined period, to the total amount of I/O commands within the predetermined period. For example, the frequency may be a random integer between 0 and 100. The random integer means that the ratio of the amount of I/O commands, which dispatches are to be injected with delays within the predetermined period, to the total amount of I/O commands within the predetermined period is from 0% to 100%, wherein 0% means no delay injecting, while 100% means always injecting delays. In this regard, in S340, it is determined whether frequency of injecting delay is specified by the user, i.e., it is determined whether the delay injection policy indicates the frequency at which dispatches of the predetermined number of I/O commands are to be injected with delays. If yes, procedure 300 proceeds to S350, else procedure 300 returns to S330.

In S350, a random algorithm is used to determine whether to inject the delay to the dispatch of the intercepted I/O command in S360. Specifically, in S350, a random algorithm is used to generate a random number ranging between 0 and 100 uniformly. Next, in S360, the generated random number is compared with the frequency of injection delay as indicated by the delay injection policy. If the generated random number is greater than the frequency of injection delay, then procedure 300 proceeds to S370, else to S380.

In S370, the dispatch of the intercepted I/O is injected with the delay. Specifically, injecting the delay to the dispatch of the intercepted I/O in S370 may comprise: applying a timer with respect to the intercepted I/O, and setting a timeout value of the timer as the desired duration of delay. The duration may be determined according to the type of the storage disk. For example, for a storage disk used in a personal computer, the duration may be determined as 10 ms; while for a SSD, the duration may be determined as 1 ms. When the timer times out, the remaining slow I/O count is decreased and procedure 300 proceeds to S380.

Alternatively, in S370, the dispatch of the intercepted I/O is injected with the delay in the following way. Specifically, the intercepted I/O may be added to a pending list and the time when the I/O is added to the list may be recorded, as T0 for example. Further, a specific thread may be used to periodically check this list at a predetermined interval, which interval may be determined according to the duration (e.g., D0) of delay desired to be injected. For example, for a storage disk in a personal computer, if the desired duration of delay is determined as 10 ms, then the interval may be set as 1 ms. Assume the list is checked at the time T1, with respect to each intercepted I/O, if T1−T0>=D0, then the remaining slow I/O count is decreased and procedure 300 proceeds to S380.

In S380, the I/O command is sent via a common SCSI I/O dispatch interface to the lower layer, for example, HBA driver layer 140 as shown in FIG. 1.

It should be understood the procedure of injection delay has been described only for the illustration purpose, whereas the embodiment of the present disclosure is not limited thereto. Under the teaching of the embodiment of the present disclosure, those skilled in the art may use any appropriate means to inject a delay to dispatch of the intercepted I/O.

In addition, it should be understood the procedure of injecting a delay to dispatch of a specific type of I/O commands for a specific storage disk in the storage system has been described with reference to FIG. 3 for the illustration purpose only. Based on the indication of the delay injection policy and under the teaching of the embodiment of the present disclosure, however, those skilled in the art may use a procedure similar to procedure 300 to inject delays to dispatches of all types of I/O commands for a specific storage disk in the storage system, inject delays to dispatches of a specific type of I/O commands for all storage disks in the storage system, or inject delays to dispatches of all types of I/O commands for all storage disks in the storage system through more or less steps than those included in procedure 300.

Figure 4:
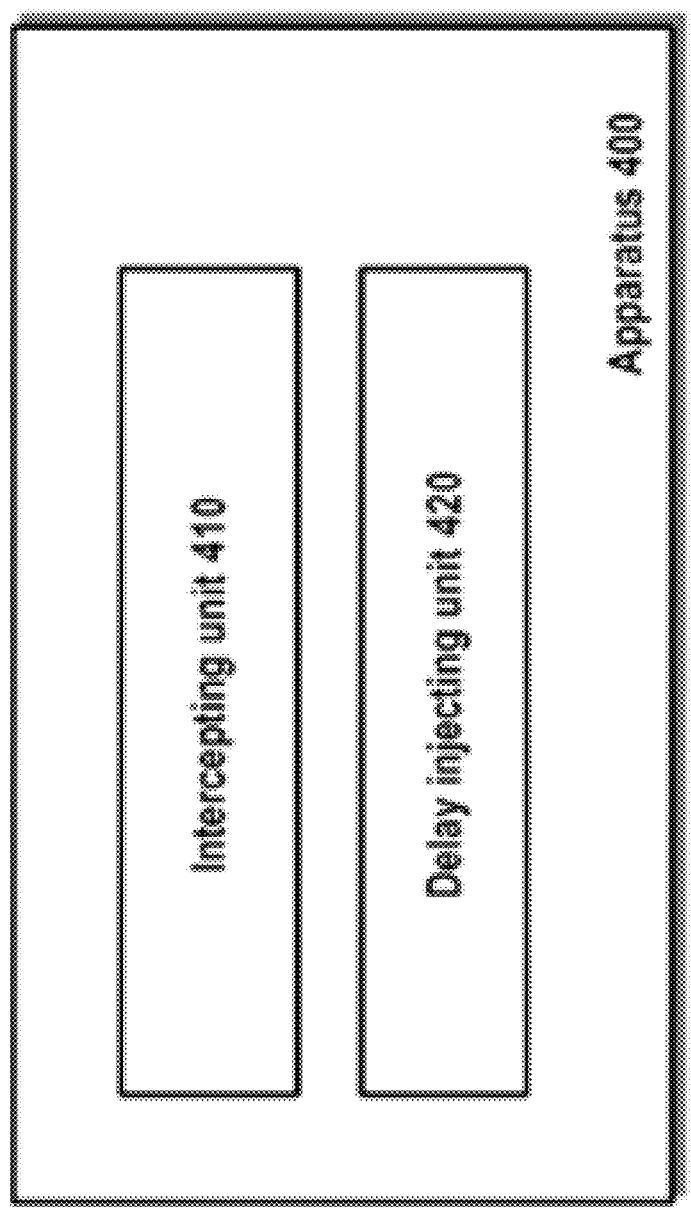
FIG. 4 shows a block diagram of an apparatus for simulating a slow disk according to an embodiment of the present disclosure.

Embodiments of the present disclosure also provide an apparatus for simulating a slow storage disk. FIG. 4 shows a block diagram of an apparatus 400 of simulating a slow disk according to an embodiment of the present disclosure. Apparatus 400 may be implemented on any appropriate server.

As shown in FIG. 4, apparatus 400 comprises: an intercepting unit 410 configured to intercept an input/output I/O command to be dispatched to a storage disk; and a delay injecting unit 420 configured to simulate the slow storage disk with the storage disk by injecting a delay to dispatch of the intercepted I/O command based on a predetermined delay injection policy.

In some embodiments, the delay injection policy indicates at least one of the following: storage disks for which the delay injection policy is to be used and a type of I/O commands for which the delay injection policy is to be used.

In some embodiments, if the delay injection policy indicates the storage disks for which the delay injection policy is to be used, the delay injecting unit 420 is further configured to: identify the storage disk to which the intercepted I/O command is to be dispatched; determine whether the storage disk to which the intercepted I/O command is to be dispatched matches one of the storage disks indicated by the delay injection policy; and in response to the storage disk to which the intercepted I/O command is to be dispatched matching one of the storage disks indicated by the delay injection policy, inject the delay to the dispatch of the intercepted I/O command.

In some embodiments, if the delay injection policy indicates the type of I/O commands for which the delay injection policy is to be used, the delay injecting unit is further configured to: identify a type of the intercepted I/O command; determine whether the identified type matches the type of I/O commands indicated by the delay injection policy; and in response to the identified type matching the type of I/O commands indicated by the delay injection policy, inject the delay to the dispatch of the intercepted I/O command.

In some embodiments, the delay injection policy further indicates: injecting delays to dispatches of a predetermined number of I/O commands; and a frequency at which the delays are to be injected to the dispatches of the predetermined number of I/O commands.

Figure 5:
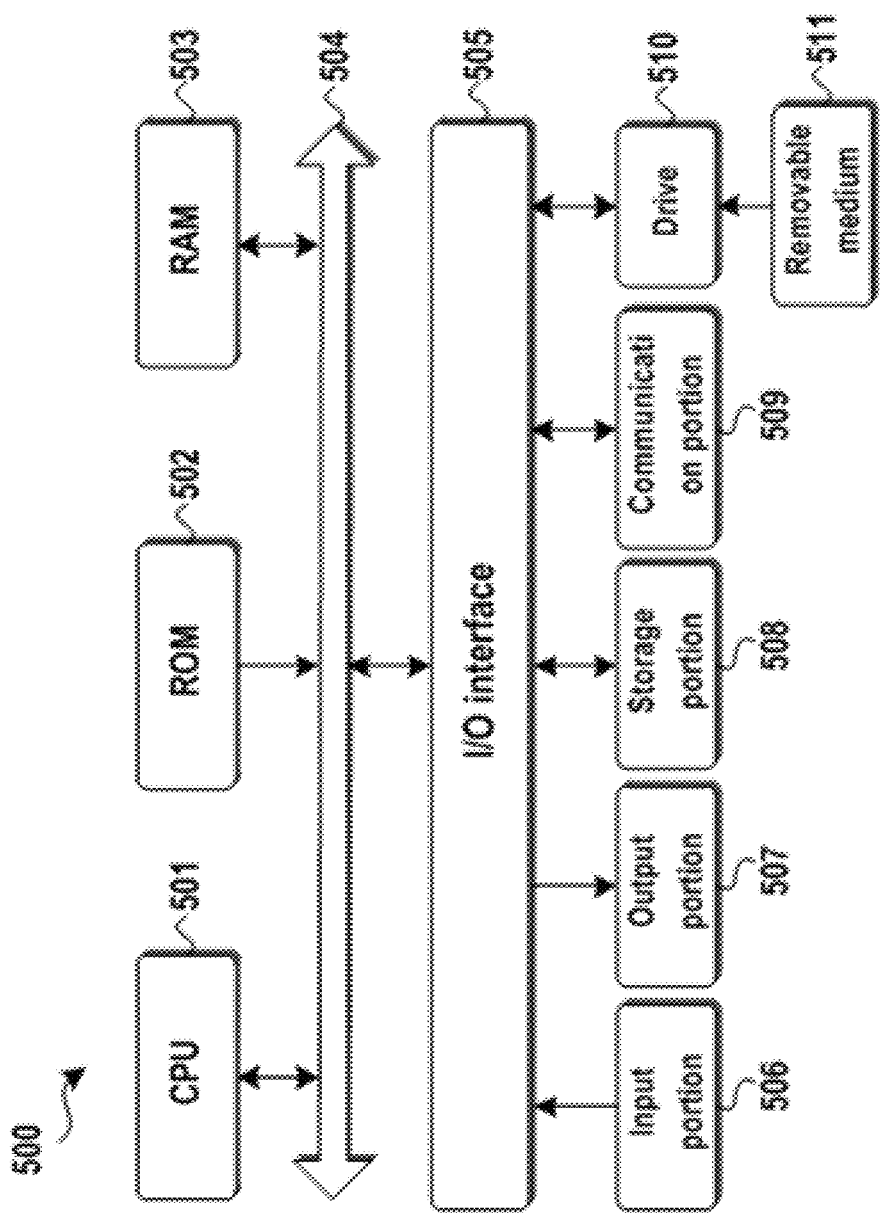
FIG. 5 shows a schematic block diagram of a computer system suitable for implementing the embodiments of the present disclosure.

FIG. 5 shows a schematic block diagram of a computer system suitable for implementing the embodiments of the present disclosure. As shown in FIG. 5, computer system 500 comprises a central processing unit (CPU) 501 which is capable of performing various appropriate actions and processes in accordance with a program stored in a read only memory (ROM) 502 or a program loaded from a storage unit 508 to a random access memory (RAM) 503. In RAM 503, data required when CPU 501 performs the various processes or the like is also stored as required. CPU 501, ROM 502 and RAM 503 are connected to one another via a bus 504. An input/output (I/O) interface 505 is also connected to bus 504.

The following components are connected to I/O interface 505: an input portion 506 including a keyboard, a mouse, or the like; an output portion 507 including a display such as a cathode ray tube (CRT), a liquid crystal display (LCD), or the like, and a loudspeaker or the like; a storage portion 508 including a storage disk or the like; and a communication portion 509 including a network interface card such as a LAN card, a modem, or the like. Communication portion 509 performs a communication process via the network such as the internet. A drive 510 is also connected to I/O interface 505 as required. A removable medium 511, such as a magnetic disk, an optical disk, a magneto-optical disk, a semiconductor memory, or the like, is mounted on drive 510 as required, so that a computer program read therefrom is installed into storage portion 508 as required.

Specifically, in accordance with embodiments of the present disclosure, the processes described with reference to FIGS. 2 and 3 may be implemented as computer software programs. For example, embodiments of the present disclosure comprise a computer program product including a computer program tangibly embodied on a machine readable medium, the computer program including program code for performing methods 200 and 300.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present disclosure include a computer program product comprising a computer program tangibly embodied on a machine readable medium, the computer program containing program codes configured to carry out the methods as described above.

In the context of the disclosure, a computer readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present disclosure may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any disclosure or of what may be claimed, but rather as descriptions of features that may be specific to particular embodiments of particular disclosures. Certain features that are described in this specification in the context of separate embodiments may also be implemented in combination in a single embodiment. Conversely, various features that are described in the context of a single embodiment may also be implemented in multiple embodiments separately or in any suitable sub-combination.

Various modifications, adaptations to the foregoing example embodiments of this disclosure may become apparent to those skilled in the relevant arts in view of the foregoing description, when read in conjunction with the accompanying drawings. Any and all modifications will still fall within the scope of the non-limiting and example embodiments of this disclosure. Furthermore, other embodiments of the disclosures set forth herein will come to mind to one skilled in the art to which these embodiments of the disclosure pertain having the benefit of the teachings presented in the foregoing descriptions and the drawings.

It will be appreciated that the embodiments of the present disclosure are not to be limited to the specific embodiments as discussed above and that modifications and other embodiments are intended to be included within the scope of the appended claims. Although specific terms are used herein, they are used in a generic and descriptive sense only and not for purposes of limitation.

We claim:

1. A method for simulating a slow storage disk, comprising:
   intercepting an input/output (I/O) command to a storage disk; and
   simulating the slow storage disk with the storage disk by injecting a delay to a dispatch of the intercepted I/O command by delaying the dispatch of the intercepted I/O command to the storage disk by a desired duration of delay indicated by a predetermined delay injection policy, wherein the delay is injected within a SCSI (Small Computer System Interface) software stack at a middle layer above a driver layer that forwards a package encapsulating the I/O command to a controller of the storage disk via a storage network, wherein the injection policy further indicates injecting delays to dispatches of a predetermined number of I/O commands and a frequency at which the delays are to be injected to the dispatches of the predetermined number of I/O commands, and wherein injecting the delay to the dispatch of the intercepted I/O command includes determining whether to inject the delay to the dispatch of the intercepted I/O command at least in part by using a random algorithm to generate a random number and injecting the delay responsive to the random number exceeding the frequency indicated by the injection policy.

2. The method according to claim 1, wherein the predetermined delay injection policy indicates at least one of the following:
   storage disks for which the predetermined delay injection policy is to be used and a type of I/O commands for which the predetermined delay injection policy is to be used.

3. The method according to claim 2, wherein if the predetermined delay injection policy indicates the storage disks for which the predetermined delay injection policy is to be used, the injecting the delay to the dispatch of the intercepted I/O command comprises:
   identifying the storage disk to which the intercepted I/O command is to be dispatched;
   determining whether the storage disk to which the intercepted I/O command is to be dispatched matches one of the storage disks indicated by the predetermined delay injection policy; and
   in response to the storage disk to which the intercepted I/O command is to be dispatched matching one of the storage disks indicated by the predetermined delay injection policy, injecting the delay to the dispatch of the intercepted I/O command.

4. The method according to claim 2, wherein if the predetermined delay injection policy indicates the type of I/O commands for which the predetermined delay injection policy is to be used, the injecting the delay to the dispatch of the intercepted I/O command comprises:
   identifying a type of the intercepted I/O command;
   determining whether the identified type matches the type of I/O commands indicated by the predetermined delay injection policy; and
   in response to the identified type matching the type of I/O commands indicated by the predetermined delay injection policy, injecting the delay to the dispatch of the intercepted I/O command.

5. A system, comprising:
   a data storage system including a storage disk; and
   computer-executable program logic encoded in memory of one or more computers enabled to simulate a slow storage disk using the storage disk, wherein the computer-executable program logic is configured for the execution of:
      intercepting an input/output (I/O) command to a storage disk; and
      simulating the slow storage disk with the storage disk by injecting a delay to a dispatch of the intercepted I/O command by delaying the dispatch of the intercepted I/O command to the storage disk by a desired duration of delay indicated by a predetermined delay injection policy, wherein the delay is injected within a SCSI (Small Computer System Interface) software stack at a middle layer above a driver layer that forwards a package encapsulating the I/O command to a controller of the storage disk via a storage network, wherein the injection policy further indicates injecting delays to dispatches of a predetermined number of I/O commands and a frequency at which the delays are to be injected to the dispatches of the predetermined number of I/O commands, and wherein injecting the delay to the dispatch of the intercepted I/O command includes determining whether to inject the delay to the dispatch of the intercepted I/O command at least in part by using a random algorithm to generate a random number and injecting the delay responsive to the random number exceeding the frequency indicated by the injection policy.

6. The system of claim 5, wherein the predetermined delay injection policy indicates at least one of the following: storage disks for which the predetermined delay injection policy is to be used and a type of I/O commands for which the predetermined delay injection policy is to be used.

7. The system of claim 6, wherein if the predetermined delay injection policy indicates the storage disks for which the predetermined delay injection policy is to be used, the injecting the delay to the dispatch of the intercepted I/O command comprises:
identifying the storage disk to which the intercepted I/O command is to be dispatched;
determining whether the storage disk to which the intercepted I/O command is to be dispatched matches one of the storage disks indicated by the predetermined delay injection policy; and
in response to the storage disk to which the intercepted I/O command is to be dispatched matching one of the storage disks indicated by the predetermined delay injection policy, injecting the delay to the dispatch of the intercepted I/O command.

8. The system of claim 6, wherein if the predetermined delay injection policy indicates the type of I/O commands for which the predetermined delay injection policy is to be used, the injecting the delay to the dispatch of the intercepted I/O command comprises:
identifying a type of the intercepted I/O command;
determining whether the identified type matches the type of I/O commands indicated by the predetermined delay injection policy; and
in response to the identified type matching the type of I/O commands indicated by the predetermined delay injection policy, injecting the delay to the dispatch of the intercepted I/O command.

9. A computer program product including a non-transitory computer readable medium having instructions stored thereon for simulating a slow storage disk, wherein the instructions, when executed on a device, cause the device to execute a method including:
intercepting an input/output (I/O) command to a storage disk; and
simulating the slow storage disk with the storage disk by injecting a delay to a dispatch of the intercepted I/O command by delaying the dispatch of the intercepted I/O command to the storage disk by a desired duration of delay indicated by a predetermined delay injection policy, wherein the delay is injected within a SCSI (Small Computer System Interface) software stack at a middle layer above a driver layer that forwards a package encapsulating the I/O command to a controller of the storage disk via a storage network, wherein the injection policy further indicates injecting delays to dispatches of a predetermined number of I/O commands and a frequency at which the delays are to be injected to the dispatches of the predetermined number of I/O commands, and wherein injecting the delay to the dispatch of the intercepted I/O command includes determining whether to inject the delay to the dispatch of the intercepted I/O command at least in part by using a random algorithm to generate a random number and injecting the delay responsive to the random number exceeding the frequency indicated by the injection policy.

10. The computer program product of claim 9, wherein the predetermined delay injection policy indicates at least one of the following: storage disks for which the predetermined delay injection policy is to be used and a type of I/O commands for which the predetermined delay injection policy is to be used.

11. The computer program product of claim 10, wherein if the predetermined delay injection policy indicates the storage disks for which the delay injection policy is to be used, the injecting the delay to the dispatch of the intercepted I/O command comprises:
identifying the storage disk to which the intercepted I/O command is to be dispatched;
determining whether the storage disk to which the intercepted I/O command is to be dispatched matches one of the storage disks indicated by the predetermined delay injection policy; and
in response to the storage disk to which the intercepted I/O command is to be dispatched matching one of the storage disks indicated by the predetermined delay injection policy, injecting the delay to the dispatch of the intercepted I/O command.

12. The computer program product of claim 10, wherein if the predetermined delay injection policy indicates the type of I/O commands for which the predetermined delay injection policy is to be used, the injecting the delay to the dispatch of the intercepted I/O command comprises:
identifying a type of the intercepted I/O command;
determining whether the identified type matches the type of I/O commands indicated by the predetermined delay injection policy; and
in response to the identified type matching the type of I/O commands indicated by the predetermined delay injection policy, injecting the delay to the dispatch of the intercepted I/O command.

13. The method of claim 1, wherein injecting the delay to the dispatch of the intercepted I/O command based on the predetermined delay injection policy further comprises:
applying a timer with respect to the intercepted I/O command; and
setting a timeout value of the timer to the desired duration of delay.

14. The method of claim 1, wherein injecting the delay to the dispatch of the intercepted I/O command based on the predetermined delay injection policy further comprises:
adding the intercepted I/O command to a pending list;
recording a time at which the intercepted I/O command is added to the pending list; and
periodically checking the pending list at a predetermined interval equal to the desired duration of delay.

15. The method according to claim 1, further comprising:
determining the desired duration of delay based at least in part on a type of the storage disk.

16. The method according to claim 1, wherein delaying the dispatch of the intercepted I/O command extends an amount of time used for dispatching the I/O request to the storage disk.

17. The method according to claim 1, wherein the controller parses the received package and translates it into an I/O command recognizable to the storage disk.

* * * * *